US010055887B1

(12) United States Patent
Gil et al.

(10) Patent No.: US 10,055,887 B1
(45) Date of Patent: Aug. 21, 2018

(54) VIRTUAL/AUGMENTED REALITY TRANSITION SYSTEM AND METHOD

(71) Applicant: GOOGLE INC., Mountain View, CA (US)

(72) Inventors: Leandro Gracia Gil, San Jose, CA (US); Christian Plagemann, Palo Alto, CA (US); Alexander James Faaborg, Mountain View, CA (US); Joshua Weaver, Mountain View, CA (US); Michael Simonian, Mountain View, CA (US); Glen Murphy, Palo Alto, CA (US); Jon Wiley, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 357 days.

(21) Appl. No.: 14/626,751

(22) Filed: Feb. 19, 2015

(51) Int. Cl.
| | |
|---|---|
| *G02B 27/01* | (2006.01) |
| *G06F 3/01* | (2006.01) |
| *G06T 19/00* | (2011.01) |
| *G06T 7/00* | (2017.01) |
| *A63F 13/00* | (2014.01) |
| *H04N 7/18* | (2006.01) |

(Continued)

(52) U.S. Cl.
CPC .......... *G06T 19/006* (2013.01); *G02B 27/017* (2013.01); *G06F 3/011* (2013.01); *G09G 3/003* (2013.01); *G09G 5/10* (2013.01); *H04N 7/183* (2013.01); *G02B 2027/014* (2013.01); *G02B 2027/0138* (2013.01); *G02B 2027/0141* (2013.01); *G09G 2320/0626* (2013.01); *G09G 2354/00* (2013.01)

(58) Field of Classification Search
CPC ............ G02B 27/017; G02B 2027/147; G02B 27/0176; G02B 27/0093; G02B 27/0101; G02B 2027/014; G06F 3/012; G06F 3/017; G09G 2360/144; G09G 2320/0626
See application file for complete search history.

(56) References Cited

U.S. PATENT DOCUMENTS

| | | | |
|---|---|---|---|
| 7,696,992 | B2 | 4/2010 | Gyorfi et al. |
| 8,620,021 | B2 | 12/2013 | Knudson et al. |

(Continued)

FOREIGN PATENT DOCUMENTS

CN          103871109 A       6/2014

*Primary Examiner* — Dave Czekaj
*Assistant Examiner* — Alison Slater
(74) *Attorney, Agent, or Firm* — Brake Hughes Bellermann LLP

(57) ABSTRACT

A system and method of operating an audio visual device generating a virtual immersive experience is provided. The system may include an optical system and a display system received in a housing, and an audio output device operably coupled to the display system, the housing being coupled to a frame to be worn by a user. A sensing device may sense at least one of an ambient brightness level or an ambient noise level, and a control system and processor operably coupled to the optical system, the display system, the audio output device and the sensing device may, in response to an external command to transition between the virtual environment and the ambient environment, adjust at least one of a brightness level or a noise level of the virtual environment based on the sensed ambient brightness level and/or the sensed ambient noise level before executing the received external command.

17 Claims, 11 Drawing Sheets

(51) Int. Cl.
*G09G 3/00* (2006.01)
*G09G 5/10* (2006.01)

(56) References Cited

U.S. PATENT DOCUMENTS

| | | | |
|---|---|---|---|
| 8,907,983 B2 | 12/2014 | Mcardle et al. | |
| 2009/0132309 A1 | 5/2009 | Marin et al. | |
| 2013/0293688 A1* | 11/2013 | Benson | G02B 27/017 348/53 |
| 2014/0316192 A1* | 10/2014 | de Zambotti | A61M 21/02 600/28 |
| 2014/0361976 A1* | 12/2014 | Osman | G02B 27/0172 345/156 |
| 2015/0032812 A1* | 1/2015 | Dudley | H04N 21/42203 709/204 |
| 2015/0054734 A1* | 2/2015 | Raghoebardajal | G06F 3/017 345/156 |
| 2015/0084864 A1* | 3/2015 | Geiss | G06F 3/013 345/158 |
| 2015/0094142 A1* | 4/2015 | Stafford | A63F 13/212 463/31 |
| 2015/0323795 A1* | 11/2015 | Alton | G02B 27/0172 349/11 |
| 2016/0054565 A1* | 2/2016 | Izumihara | G09G 5/00 345/8 |
| 2016/0178905 A1* | 6/2016 | Rider | G06F 3/0489 345/8 |
| 2016/0210097 A1* | 7/2016 | Forutanpour | G06F 3/1423 |
| 2016/0210780 A1* | 7/2016 | Paulovich | G06T 7/73 |

\* cited by examiner

VIRTUAL/AUGMENTED REALITY TRANSITION SYSTEM AND METHOD

FIELD

This document relates, generally, to a virtual reality system, and in particular, to a virtual reality system having sensors that sense characteristics of an external environment of the virtual reality system.

BACKGROUND

In an immersive experience, such as an experience generated by a Virtual Reality (VR)/Augmented Reality (AR) system, a relatively clear separation may exist between the immersive experience generated by the VR/AR system, or the "virtual" world, and the environment outside of the virtual world, or the "real" world. When experienced using a Head Mounted Display (HMD) or other similar device, transitions into and out of the immersive experience may be affected by differences between the environment within the virtual world and the environment outside the virtual world.

SUMMARY

In one aspect, method of operating an audio visual device configured to generate a virtual immersive experience, including receiving a command to transition between the virtual immersive experience generated by the audio visual device in a virtual environment and an ambient environment, in response to the received command, activating a sensing device and sensing a brightness level of the ambient environment, comparing the sensed brightness level of the ambient environment to a brightness level of the virtual environment and calculating a difference between the ambient brightness level and the virtual brightness level, when the calculated difference between the ambient brightness level and the virtual brightness level is greater than a preset brightness threshold, incrementally adjusting the virtual brightness level toward the ambient brightness level until the difference between the ambient brightness level and the virtual brightness level is less than or equal to the preset brightness threshold, and transitioning between the virtual environment and the ambient environment when the difference between the ambient brightness level and the virtual brightness level is less than or equal to the preset brightness threshold.

In another aspect, audio visual device configured to generate an immersive virtual experience in a virtual environment may include a frame, a housing coupled to the frame, an optical system and a display system received in the housing, an audio output device operably coupled to the display system, a sensing device located and configured to sense at least one of an ambient brightness level or an ambient noise level, a control system and processor operably coupled to the optical system, the display system, the audio output device and the sensing device, the control system including a transition module configured to, in response to an external command to transition between the virtual environment and the ambient environment, adjust at least one of a brightness level or a noise level of the virtual environment based on the sensed at least one of the ambient brightness level or the ambient noise level before executing the received external command.

The details of one or more implementations are set forth in the accompanying drawings and the description below.

Other features will be apparent from the description and drawings, and from the claims.

DETAILED DESCRIPTION

Figure 1A:
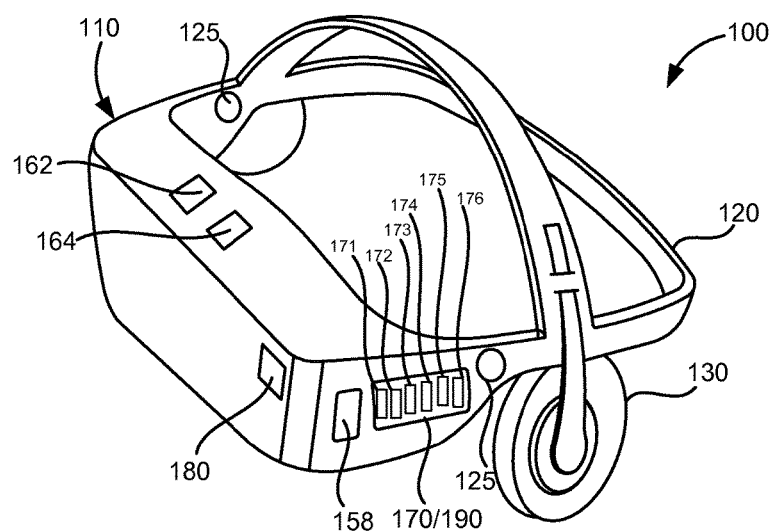
FIG. 1A is a perspective view of a head mounted display device, in accordance with an embodiment broadly described herein.

A Virtual Reality (VR)/Augmented Reality (AR) system may include, for example, a head mounted display device (HMD) or similar device worn by a user, for example, on a head of the user, and capable of displaying the immersive VR environment to the user. Comfort and ease of entering into the virtual immersive experience (or the "virtual world") from the ambient environment (or the "real world"), and/or leaving the virtual immersive experience and returning to the ambient environment, may be affected by differences between the immersive environment and the outside environment. Factors that may affect the ease and comfort of this transition for the user may include for example, a difference in light level and/or brightness between the immersive experience and the outside environment, a difference in sound, or noise, level between the immersive experience and the outside environment, and other such factors. Relatively large differences between these environmental factors may make transitions between the virtual world and the real world unnecessarily abrupt, uncomfortable, and difficult to adapt to.

For example, in the case of an HMD, a screen may extend across the user's/wearer's field of view, with headphones/ear buds providing associated sound, to provide an immersive VR or AR experience. In this arrangement, to enter the VR/AR experience, the user may simply put on the HMD including the headphones, and to leave the VR/AR experience, the user may simply remove the HMD and headphones. However, if the user wearing the HMD in this scenario is playing a relatively dark game, but is in a relatively brightly lit room, the user is likely to experience an abrupt, and significant, change in brightness when leaving the immersive VR/AR experience, leaving the user unable to see properly while the user's eyes adapt to the new (brighter) level of ambient light. Similarly, if the user is in a relatively quiet room, and is to begin playing a relatively loud game, the user is likely to experience a very sudden, abrupt, change (increase) in sound level when entering the immersive VR experience, causing discomfort and difficulty in adapting to the increased sound level.

In a system and method for automatic environment adaptation, in accordance with embodiments as broadly described herein, differences between the user's virtual world environment and the user's real world (e.g., physical world, ambient) environment may be taken into account to facilitate these types of transitions between the virtual world and the real world. Hereinafter, transitions between the virtual environment and the ambient environment may include a transition in which the user immersed in the virtual environment transitions into the ambient environment, and a transition in which the user in the ambient environment enters the virtual environment.

In one embodiment, the system may employ sensors, such as, for example, photo resistors, microphones, cameras and other such sensors, to detect various environmental factors, determine differences between these environmental factors in the virtual world with these environmental factors in the real world, and automatically produce a transition between the virtual world and the real world. In some embodiments, these differences may be measured by these types of sensors included in the HMD, and/or in a mobile device, and/or in some type of remote device or service. For example, the system may use one or more of these types of sensors to assess a difference in display brightness versus ambient light level, headphone volume versus ambient sound level, and the like, to produce a relatively fast but gradual transition between the real world and the virtual world. The transition can be performed so that one or more environmental factors, for example, brightness level, sound level, contrast level, movement level, and other such factors associated with the real world which may affect a user's comfortable transition between the virtual world and the real world can be matched or changed in the virtual world to be closer to their corresponding environmental factors in the real world.

In some embodiments, these adjustments may be accomplished so that a level associated with a particular factor in the virtual world (e.g., a brightness level, a sound level, a contrast level, a movement level and the like) is at or near a level of the corresponding environmental factor in the real world or ambient environment. For example, in some embodiments, a particular factor in the virtual world may be adjusted so that it reaches essentially the same level as that of a corresponding factor in the real world. In some embodiments, a particular factor in the virtual world may be adjusted so that it reaches a level that is within a particular interval of a corresponding factor in the real world. In some embodiments, theses adjustments may be accomplished over a given period of time. In some embodiments, these adjustments may be made until the particular environmental factor being adjusted reaches a given value, or falls within a given interval of a desired value, or reaches a given threshold value. In some embodiments, if a difference between the level associated with a particular factor in the virtual world and the level of the corresponding factor in the real world is less than, for example, a set threshold, then adjustment may not be necessary for a comfortable transition between the real world and the virtual world.

To avoid an abrupt transition between the virtual world and the real world, and facilitate the comfortable transition between the virtual world and the real world, the adjustment of one or more of the environmental factors of the virtual world based on the corresponding environmental factor(s) in the real world may be accomplished somewhat gradually, rather than in a single step. For example, in some embodiments, the adjustment of an environmental factor in the virtual world may follow a substantially linear function until a desired level is achieved or a given period of time has elapsed. In some embodiments, the adjustment of an environmental factor in the virtual world may follow a non-linear function until a desired level is achieved or a given period of time has elapsed. In some embodiments, the adjustment of an environmental factor in the virtual world may follow a step-wise function until a desired level is achieved or a given period of time has elapsed. Numerous different patterns, profiles, or slopes may be used to define the adjustment of environmental factors in the virtual world in this manner.

FIG. 1A is a perspective view of an example HMD, in accordance with an embodiment broadly described herein. In the example embodiment shown in FIG. 1A, an example HMD 100 may include a housing 110 in which optical elements may be received, and a frame 120 which allows the housing 110 to be mounted or worn on a user's head. In the example shown in FIG. 1A, an audio output device 130 is also coupled to the frame 120. As shown in the example implementation of FIG. 1A, the audio output device 130 may be, for example, speakers mounted in headphones and coupled on the frame 120 so as to be adjustably positioned over or near the user's ears when the HMD 100 is worn by the user. In some embodiments, the audio output device 130 may instead be, for example, ear buds which may be inserted into the user's ears when the HMD 100 is worn by the user. Other types of audio output devices, such as, for example, speakers integrated into the frame 120 and other such arrangements, may also be appropriate.

Figure 1B:
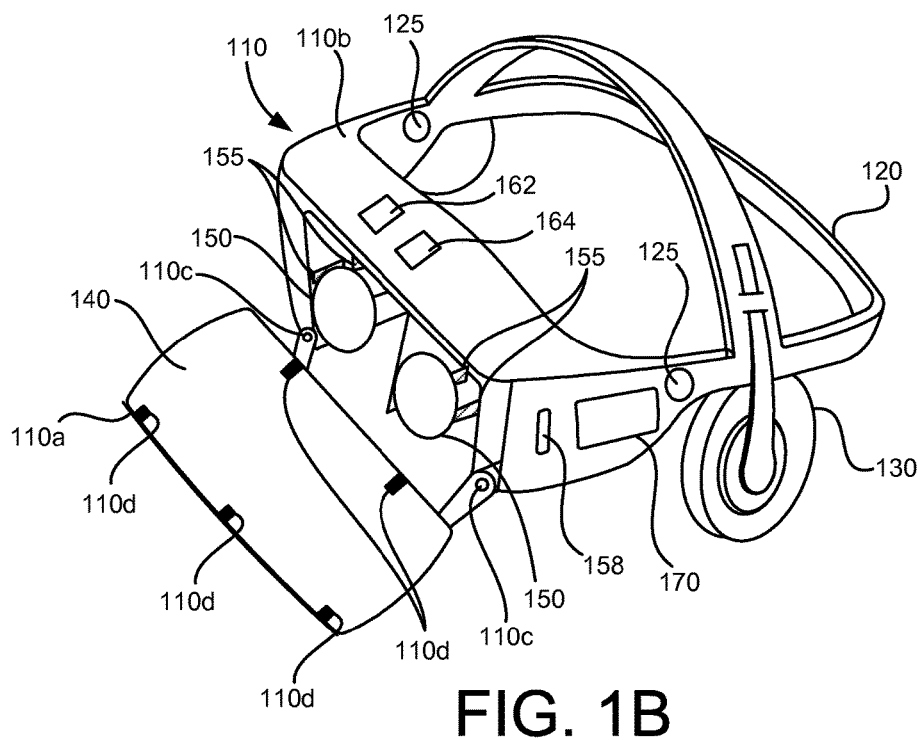
FIG. 1B is a perspective view of the head mounted display device shown in FIG. 1A, with a front face of a housing moved away from a base portion of the housing, in accordance with an embodiment broadly described herein.

FIG. 1B is a perspective view of the HMD 100 shown in FIG. 1A, with a front face 110a of the housing 110 rotated away from a base portion 110b of the housing 110 so that internal portions of the HMD 100 are visible. The front face 110a of the housing 110 may be rotatably coupled to the base portion 110b of the housing 110 by, for example, hinge shafts 110c or other rotation structure as appropriate. In some embodiments, the front face 110a of the housing 110 may be completely removable from the base portion 110b of the housing 110, and may be removably coupled to the base portion 110b of the housing 110 by, for example, snap fit on and off of the base portion 110b of the housing 110. Other coupling and removal structures for the front face 110a and base portion 110b of the housing 110 may also be appropriate. The front face 110a of the housing may include mounting structure 110d for coupling a display 140, such as, for example, a smartphone or other display device, on the front face 110a of the housing 110. Lenses 150 may be mounted in the housing 110, between the user's eyes and the display 140 when the front face 110a is in place against the base portion 110b of the housing 110. In some embodiments, the lenses 150 may be mounted in the housing 110 on an adjustable mounting structure 155, with positions of the lenses 150 controlled by an adjustment device 158, so that the lenses 150 may be aligned with respective optical axes of the user's eyes to provide a relatively wide field of view and relatively short focal length.

The HMD 100 may also include a sensing system 160 including various sensing system device and a control system 170 including various control system devices to facilitate manual user control and automated control of the HMD 100. For example, the sensing system 160 may include a light sensor 162 and an audio sensor 164, for example, on the housing 110, to sense an ambient light level and an ambient noise level in the room in which the user is wearing the HMD 100 while engaged in an immersive experience. In the example implementation shown in FIGS. 1A-1C, the light sensor 162 and audio sensor 164 are positioned on a top of the housing 110. However, the light sensor 162 and the audio sensor 164 may be positioned at other locations on the HMD 100 as appropriate for a particular arrangement of components of the particular HMD 100.

The control system 170 may include, for example, the optical adjustment device 158 described above to adjust positions of the lenses 150, a power on/off device 171, a pause device 172, a manual audio control device 172, a manual video control device 174, and other such mechanisms to control functions of the HMD 100 as appropriate. For example, in one embodiment, when a user for some reason wishes to leave the virtual immersive experience generated by the HMD 100 and return to the ambient environment, the user may pause or terminate the immersive experience by activating, for example the power on/off device 171 or pause device 172, or may activate a rotation device 175 that causes the housing 110 to move out of the field of view of the user. For example, in some embodiments, actuation of the rotation device 175 may trigger the housing 110 to rotate relative to the frame 120, for example, about hinge shafts 125 rotatably coupling the housing 110 to the frame 120, so that the housing 110 and optical elements housed therein are physically moved from the position shown in FIG. 1A to the position shown in FIG. 1C, out of the field of view of the user. This may be accomplished automatically by the HMD 100 in response to actuation of the rotation mechanism 175, or may be accomplished manually, by the user, after the fixed position of the housing 110 relative to the frame 120 shown in FIG. 1A is released by the actuation of the rotation mechanism 175.

In some embodiments, a user command to pause or terminate the immersive experience generated by the HMD 100 may trigger the HMD 100, and in particular, the display 140, to enter a pass through mode, in which the housing 110 remains in place relative to the frame 120 (as shown in FIG. 1A), and the ambient environment is visible to the user on the display 140. In this type of arrangement, the HMD 100 may also include a camera 180 capable of capturing still and moving images of the ambient environment when the HMD 100 transitions into pass through mode. The moving images captured by this camera 180 may be displayed to the user on the display 140, either instead of the immersive experience video content, or overlaid on the immersive experience video content. In pass through mode, the user may be able to leave the virtual environment and temporarily return to the ambient environment without removing the HMD 100 or otherwise changing the configuration (moving the housing 110) of the HMD 100. In some embodiments, the pass through mode may involve a gradual blending of the ambient environment with the virtual environment, blending the image input from the ambient environment received from the camera 180 with the virtual content displayed on the display 140. In some embodiments, this blending may continue until the virtual content has essentially completely faded out and been replaced by the image data received from the camera 180. In some embodiments, this blending may continue until a predetermined portion of the ambient environment is displayed.

In an embodiment in which the HMD 100 is equipped with this type of camera 180, the camera 180 may also capture ambient light/brightness levels, and may also include a microphone which may capture ambient sounds, and ambient sound levels. Thus, in some embodiments, this type of camera 180 may also function as the light sensor 162 and/or the audio sensor 164. Similarly, in an embodiment in which a smartphone is received in the housing 110, the smartphone may provide not only display capability, but may also include a camera, sensors that may capture ambient light/brightness levels, a microphone which may capture ambient sounds and ambient sound level, and provide processing capability. Accordingly, when transitioning as described above, ambient sounds captured by the microphone may be blended into the sounds in the virtual environment (as the sound in the virtual environment fades), so that ambient sound may also be blended with the sound in the virtual environment. In some embodiments, during this type of transition, sounds and images may be blended simultaneously in the manner described above. In some embodiments, during this type of transition, sounds and images may be blended independently in the manner described above.

In some embodiments, a user command to transition between the immersive experience generated by the HMD 100 and the real world may trigger the HMD 100, and in particular, the display 140, to enter a transparent mode, in which the housing 110 remains in place relative to the frame 120 (as shown in FIG. 1A), and the ambient environment is visible to the user through the display 140. In this type of arrangement, the display 140 of the HMD 100 may be a transparent display capable of transitioning between a display mode in which images are displayed to the user, and a transparent mode in which no image is displayed and the environment on the side of the display opposite the user is visible through the display 140. In the transparent mode, the virtual reality content displayed on the display 140 may gradually fade, until the display 140 is essentially transparent and the ambient environment is visible to the user through the transparent display 140.

In some embodiments, the control system 170 may also include a transition device or transition module 176, which may facilitate a user's transition between the virtual environment and the ambient environment as described above. In some embodiments, the transition device or module 176 may be intentionally and deliberately manually actuated by the user. In some embodiments, the transition device or module 176 may be automatically actuated any time the control system 170 determines that a transition between the virtual environment and the ambient environment is to be made (e.g., is commencing), to automatically adjust virtual environmental factors, for example, brightness level, noise level, etc. of the virtual environment, based on information detected and/or sensed by the sensing system 160. This will be described in more detail below.

The control system 170 may also include a processor 190 to control operation of the components of the control system 170, both when operated manually/independently, and also when operated in response to conditions detected/sensed by the sensing system 160 in response to a command received by the control system 170.

Figure 1C:
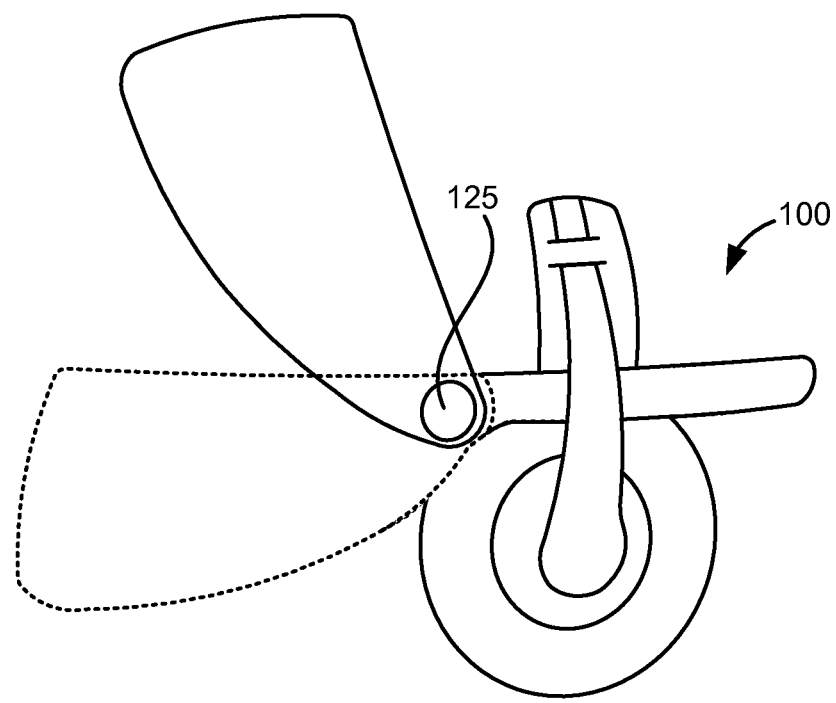
FIG. 1C is a side view of the head mounted display device shown in FIGS. 1A and 1B, with the housing in a rotated position with respect to a frame, in accordance with an embodiment broadly described herein.
Figure 2:
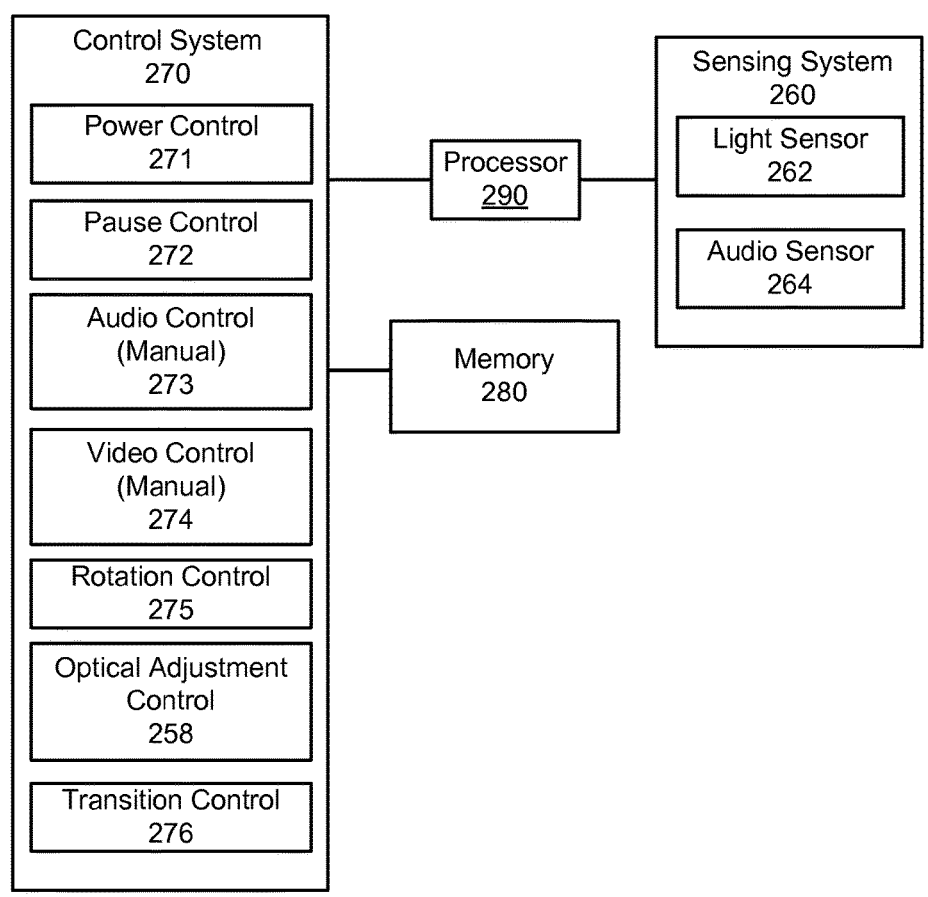
FIG. 2 is a block diagram of the head mounted display device shown in FIGS. 1A-1C, in accordance with an embodiment broadly described herein.

A block diagram of a sensing system 260 and a control system 270 is shown in FIG. 2. The sensing system 260 and the control system 270, respectively, may be similar to the sensing system 160 and the control system 170 shown in FIGS. 1A through 1C. In the example embodiment shown in FIG. 2, the sensing system 260 includes a light sensor 262 and an audio sensor 264, and the control system 270 includes a power control device 271, a pause control device 272, manual audio and video control devices 273 and 274, a rotation control device 275, an optical adjustment control device 258 and a transition control device 176. However, in some embodiments, the sensing system 260 and/or the control system 270 may include more, or fewer, devices, depending on a particular implementation. The elements included in the sensing system 260 and/or the control system 270 can have a different physical arrangement (e.g., different physical location) within, for example, an HMD other than the HMD 100 shown in FIGS. 1A through 1C.

FIGS. 3A-3D illustrate one example implementation including an HMD 100 as shown in FIGS. 1A-1C, worn on a user's head. In this example, a front portion of the HMD 100 including the display can be moved into and out of the line of sight of the user, either manually or automatically. FIGS. 3A-3D illustrate an example in which the user transitions from the virtual environment to the ambient environment. However, similar principles may also be applied in a transition from the ambient environment into the virtual environment, in that environmental factors in the virtual environment are compared to environmental factors in the ambient environment, and the environmental factors in the virtual environment are gradually adjusted based on the environmental factors in the ambient environment to facilitate a comfortable transition, in either direction.

Figure 3A:
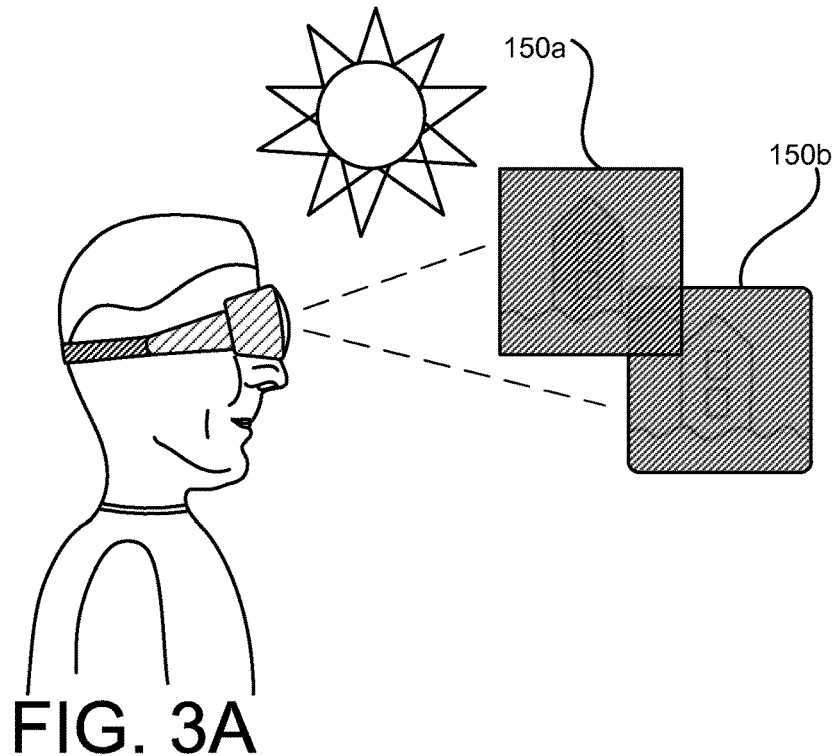
FIGS. 3A-3D illustrate one example implementation of a system for automatically adapting an environment when transitioning into and out of an immersive experience, in accordance with an embodiment broadly described herein.
Figure 3B:
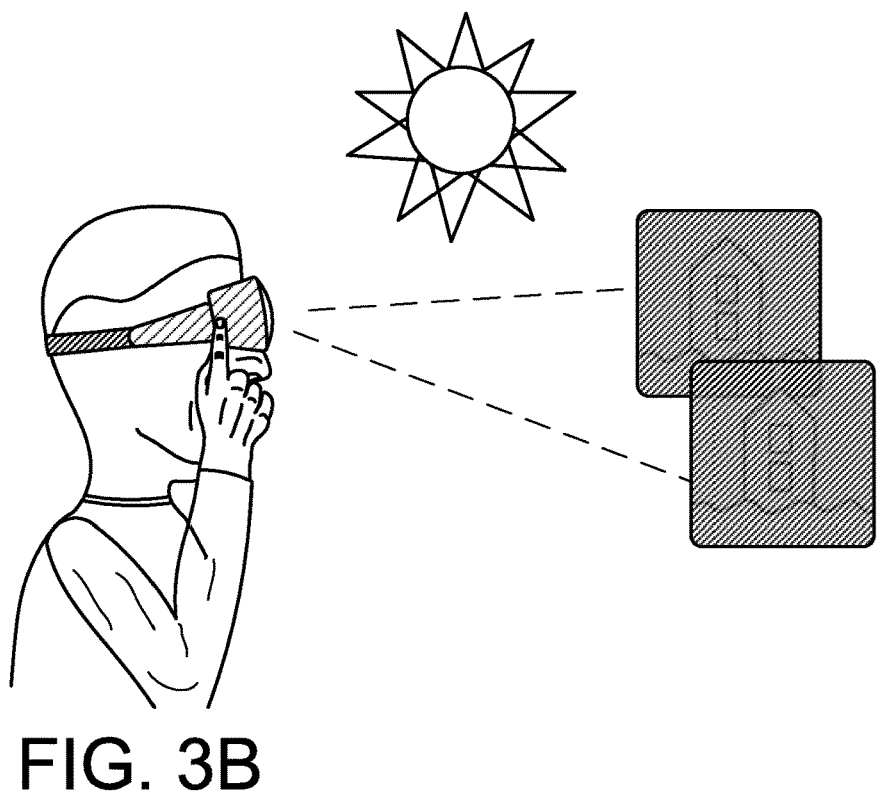

In the example implementation shown in FIGS. 3A-3D, the virtual reality content displayed on the display 140 is relatively dark, and the ambient environment is relatively bright. As shown in FIG. 3A, the user may view the content displayed by the HMD 100 through, for example, a left eye lens 150*a* and a right eye lens 150*b*. In this example, the user's field of view is illustrated by the dotted lines leading to an enlarged view of what is visible in the lenses 150*a*/150*b*. At some point during the immersive experience generated by the HMD 100, the user may decide to pause or leave the game, and may activate at least one of the devices of the control system 170 to move the display portion of the HMD 100 out of the field of view or line of sight, or to otherwise leave the virtual immersive experience and re-join the ambient environment, as shown in FIG. 3B. This may be done by, for example, pushing or otherwise activating a rotation control device 175 on the HMD 100, or by activating a power off device 171 or pause device 172 on the HMD 100, or other mechanism for inputting an appropriate command.

Figure 3C:
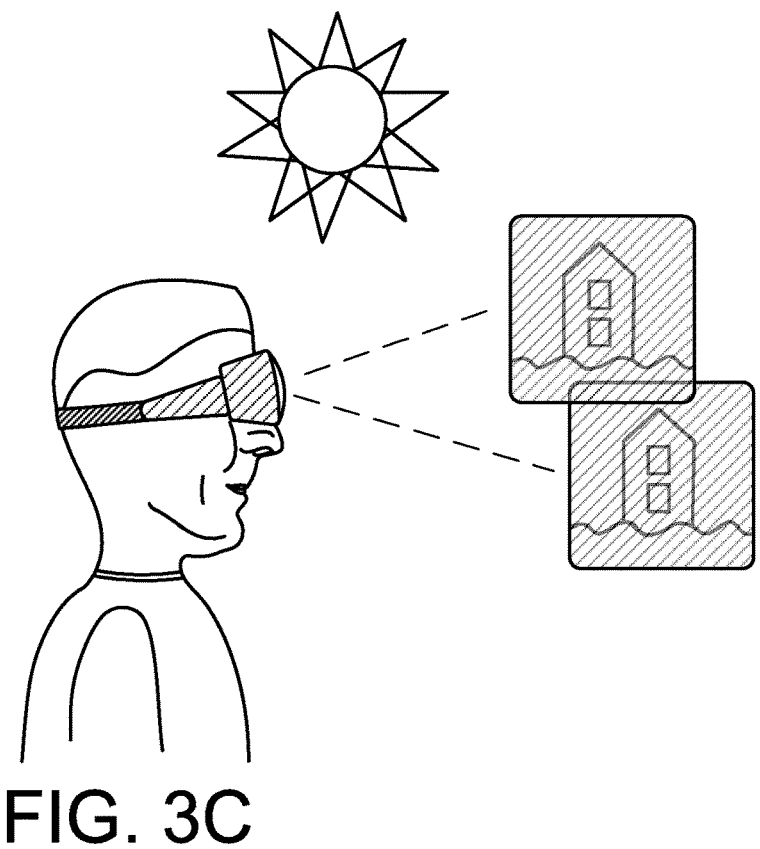
Figure 3D:
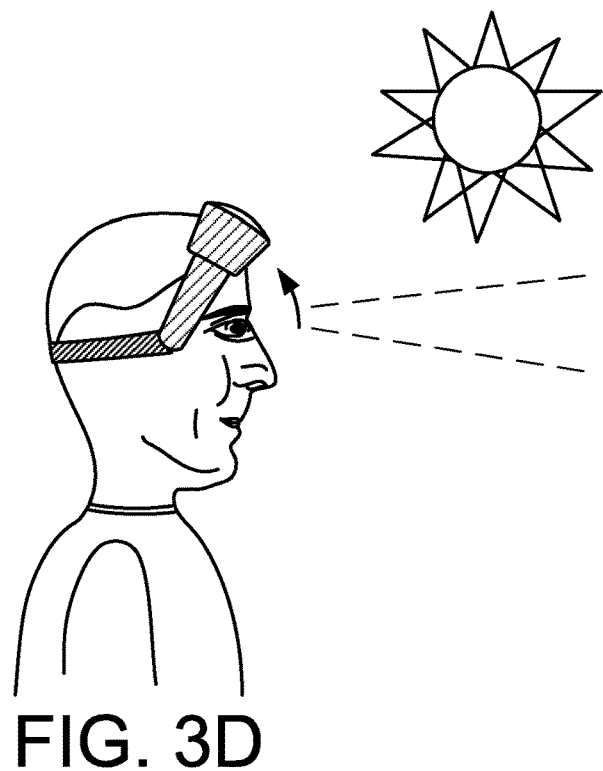

Upon receiving the transition command, for example, a command to terminate or pause the immersive experience, or other appropriate command to cause transition from the virtual immersive experience to the ambient environment, before moving the front portion of the HMD 100, or releasing a hold mechanism to allow for manual rotation of the front portion of the HMD 100, to move the display screen(s) out of the field of view of the user, the processor 190 may automatically control the sensing device 160 to sense an ambient light level, and may brighten (e.g., gradually brighten) the content displayed on the screen(s) to allow the user's eyes to adjust to a brighter environment, as shown in FIG. 3C, without an abrupt change in environment which may be uncomfortable and difficult for the user to adapt to quickly. Once the brightness level of the content displayed on the screen(s) reaches a certain level, depending on the difference between the respective virtual and ambient levels, the front portion of the HMD 100 may automatically rotate to move the display portion of the HMD 100 out of the field of view of the user, or may release a hold mechanism to allow for manual rotation of the display portion of the HMD 100 out of the field of view of the user, as shown in FIG. 3D. In this manner, the user's transition between the relatively dark virtual world and the relatively bright real world may be made as the user experiences a gradual brightening of the content displayed on the screen(s), allowing the user's eyes to adjust to the change in brightness.

In a similar manner, upon receiving the command to terminate or pause the immersive experience or other appropriate command to cause transition from the virtual immersive experience to the ambient environment, before transitioning from the virtual world to the real world, the processor may automatically control the sensing device 160 to sense an ambient sound level, and may gradually adjust a sound level associated with the content displayed on the screen(s) to allow the user to gradually adjust to more quiet, or more loud, environment, as appropriate. Once the sound level associated with the content displayed on the screen(s) and conveyed to the user through the audio output device 130 reaches a comfortable level, based on a difference between the respective virtual and ambient levels, the processor may control the HMD 100 to pause or terminate generation of the virtual immersive environment. In this manner, the user's transition between, for example, a relatively loud virtual world and a relatively quiet real world may be made gradually, with the gradual volume reduction allowing the user to gradually adjust to the ambient environment.

In some embodiments, the scenario described above with respect to FIGS. 3A-3D may include both an adjustment in a brightness level to, for example, a threshold brightness level, and also an adjustment in a sound level to, for example, a threshold sound level, and/or adjustments in other environmental factors associated with the transition between the virtual environment and the ambient environment. Adjustments to multiple environmental factors, such as, for example, brightness level and sound level, may be made concurrently, each to a respective threshold level, or in parallel, which may reduce a transition time period between the virtual environment and the ambient environment. In some embodiments, adjustments to multiple environmental factors, such as, for example, brightness level and sound level, may be made serially based on, for example, user preferences.

In some circumstances, it may not be necessary to adjust the brightness level and/or the sound level of the virtual environment when transitioning between the virtual environment and the ambient environment. For example, when a difference between the brightness level in the virtual environment and the brightness level in the ambient environment is less than a given threshold, i.e., the difference is relatively small, it may not be necessary to adjust the brightness level of the virtual environment before transitioning to the ambient environment. Similarly, when, for example, a difference between the sound level in the virtual environment and the sound level in the ambient environment is less than a given threshold, i.e., the difference is relatively small, it may not be necessary to adjust the sound level of the virtual environment before transitioning to the ambient environment.

In some embodiments, the gradual change in brightness of the virtual environment to approach the brightness level of the ambient environment may be accomplished as, for example, a display fade completed over a preset interval of time. Similarly, the gradual change in sound level of the virtual environment to approach the noise level of the ambient environment may be accomplished as, for example, a volume fade completed over a preset interval of time. These preset intervals of time may be, for example, a minimum interval of time determined to be sufficient to make an effective transition from the virtual brightness and/or sound level to the ambient brightness and/or sound level for a particular magnitude of difference between the respective virtual and ambient levels. Thus, the preset interval may vary, depending on the magnitude of the difference(s). For example, if a relatively large difference in brightness is detected between the virtual environment and the ambient environment, then the preset interval of time provided for adjusting the brightness level of the virtual environment toward the brightness level of the ambient may be longer than what would be experienced for a smaller difference in brightness. In some embodiments, instead of an increased period of time for transition for a relatively large difference in brightness levels, the period of time allowed for the transition may be essentially the same as the period of time allowed for a smaller difference in brightness levels, but the rate at which brightness is changed within the interval of time may be increased so that a particular threshold brightness level may be achieved within the fixed period of time. In some embodiments, the interval of time for transition may be set by a user based on an amount of time determined to be acceptable by the user. These profiles, patterns, preset values, user preferences and the like may be stored in a memory that is accessible to the control system and/or the processor, such as the memory 280 shown in FIG. 2.

Figure 4A:
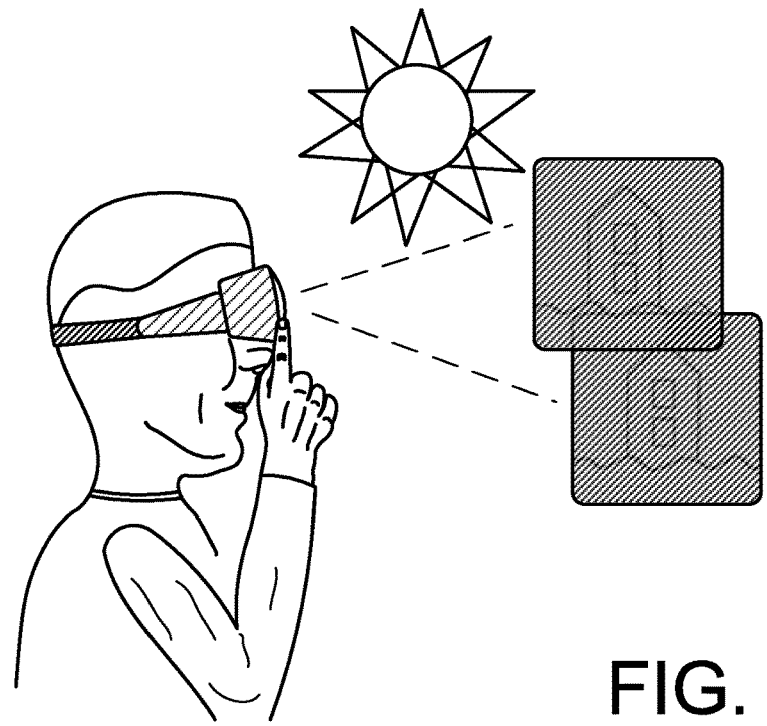
FIGS. 4A-4D illustrate another example implementation of a system for automatically adapting an environment when transitioning into and out of an immersive experience, in accordance with an embodiment as broadly described herein.
Figure 4B:
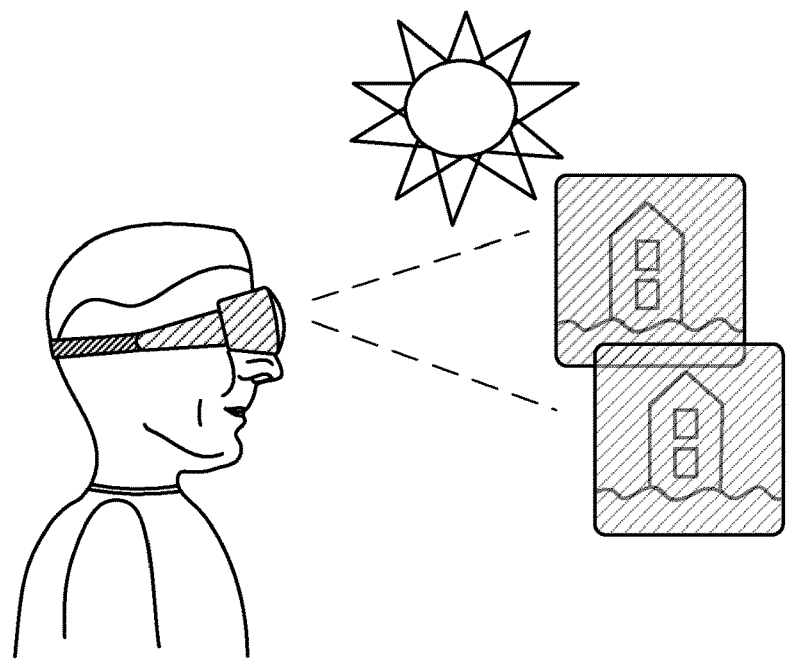
Figure 4C:
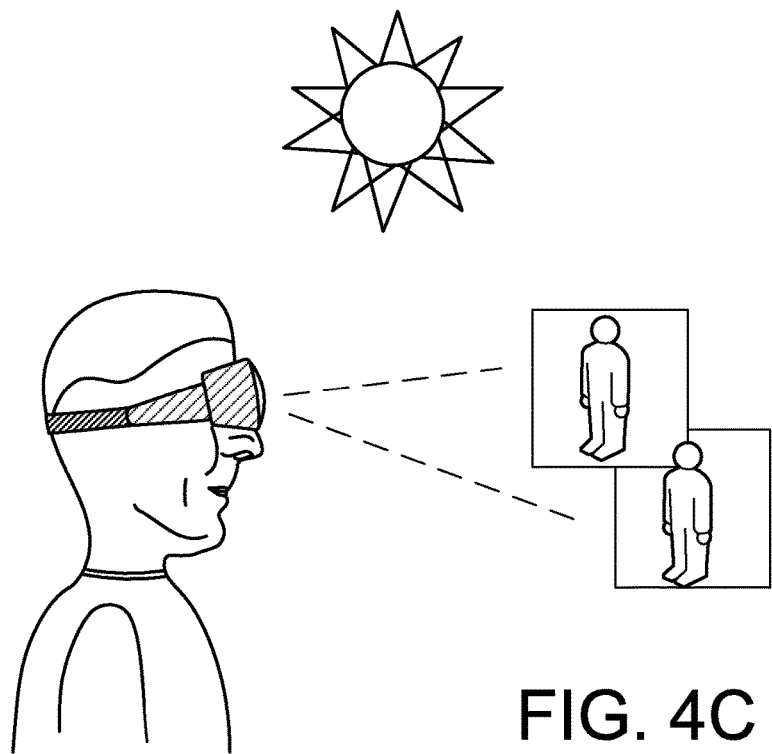

In some embodiments, the HMD 100 may be equipped with a camera 180 as described above, and thus may be capable of operating in the pass through mode as described above. In this embodiment, the transition from the virtual environment to the ambient environment may be made without moving the front portion of the HMD 100 out of the line of sight, or field of view, of the user. Rather, as described above, the ambient environment may be displayed to the user by the HMD 100 based on images captured by the camera 180 overlaid on or replacing the video content associated with the virtual immersive experience. As shown in FIGS. 4A-4C, in this embodiment, upon receiving the command to terminate or pause the immersive experience or other appropriate command to cause transition from the virtual immersive experience to the ambient environment as shown in FIG. 4A, the processor 190 may automatically control the sensing device 160 to sense an ambient light level and/or an ambient sound level, and may gradually adjust the brightness of the content displayed on the screen(s) to approach the ambient light level and allow the user's eyes to gradually adjust to the light level of the ambient environment as shown in FIG. 4B, and may gradually adjust the volume of the audio output conveyed to the user by the audio output device 130 to approach the sensed ambient sound level and allow the user to gradually adjust to the noise level of the ambient environment. Once the brightness level of the content displayed on the screen(s) and/or the volume level conveyed by the audio output device 130 reach an appropriate level as shown in FIG. 4B, the images of the ambient environment captured by the camera 180 may be displayed to the user on the HMD 100 as shown in FIG. 4C, with the audio output through the audio output device 130 suspended so that the user is able receive sound from the ambient environment. A transition from the ambient environment into the virtual environment may be handled in a similar manner, in that the user may put the HMD 100 on his/her head, with the display 140 in the pass through mode and the camera 180 providing images of the ambient environment on the display 140, and brightness and/our sound may then be adjusted from the ambient environment to the virtual environment, depending on a particular virtual environment that has been selected by the user.

Figure 4D:
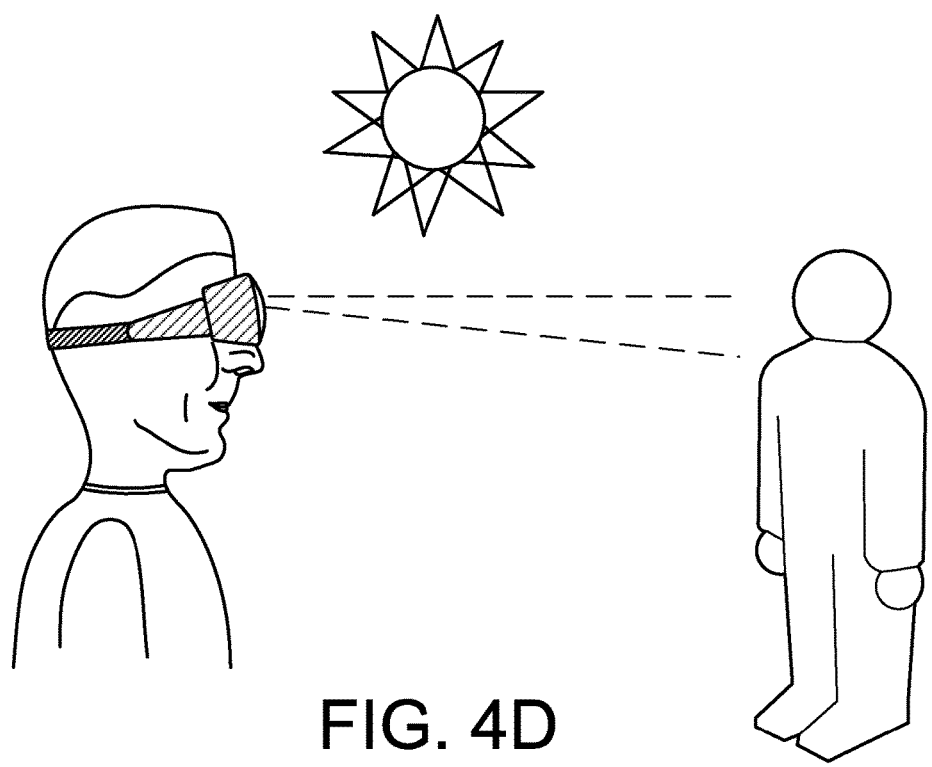

As described above, in one embodiment the HMD 100 may be capable of operation in a transparent mode in response to receiving a transition command. In the transparent mode, the housing 110 may remain in place relative to the frame 120, and the display may transition to a transparent state, allowing the ambient environment to be visible to the user through the display, as shown in FIG. 4D. A transition from the ambient environment into the virtual environment may be facilitated using the transparent mode in a similar manner.

In some embodiments, adjustment of the brightness level and/or the volume level of the immersive experience generated by the HMD 100 may be manually adjusted by the user based on ambient brightness and/or sound levels detected by the sensing device 160 in response to a user command to terminate or pause the immersive experience generated by the HMD 100 and transition to the ambient environment. For example, upon receiving the command to terminate or pause the immersive experience or other appropriate command to cause transition from the virtual immersive experience to the ambient environment, the processor 190 may automatically control the sensing device 160 to sense an ambient light level and/or an ambient sound level. These detected levels may then be observed by the user to allow for appropriate manual adjustment of the brightness and volume levels of the virtual immersive experience to facilitate transition from the virtual environment to the ambient environment. For example, an indicator of ambient brightness level and/or ambient sound level may be displayed to the user on the HMD 100. These indicators may be in the form of, for example, a number, or a bar, or other visual indicator as appropriate. The user may then actuate, for example, the manual audio control 173 and/or the manual video control 174 to adjust volume and/or brightness of the immersive experience to an acceptable level based on the sensed values displayed to the user. In some embodiments, the HMD 100 may also display an indicator of brightness level and/or volume level associated with the immersive experience together with the indicators of ambient brightness and/or sound levels, and progress indicators as the user manipulates the manual audio and/or video controls, so that the user may determine when the brightness and/or volume levels of the immersive experience have reached acceptable levels for transition from the virtual environment to the ambient environment.

Figure 5A:
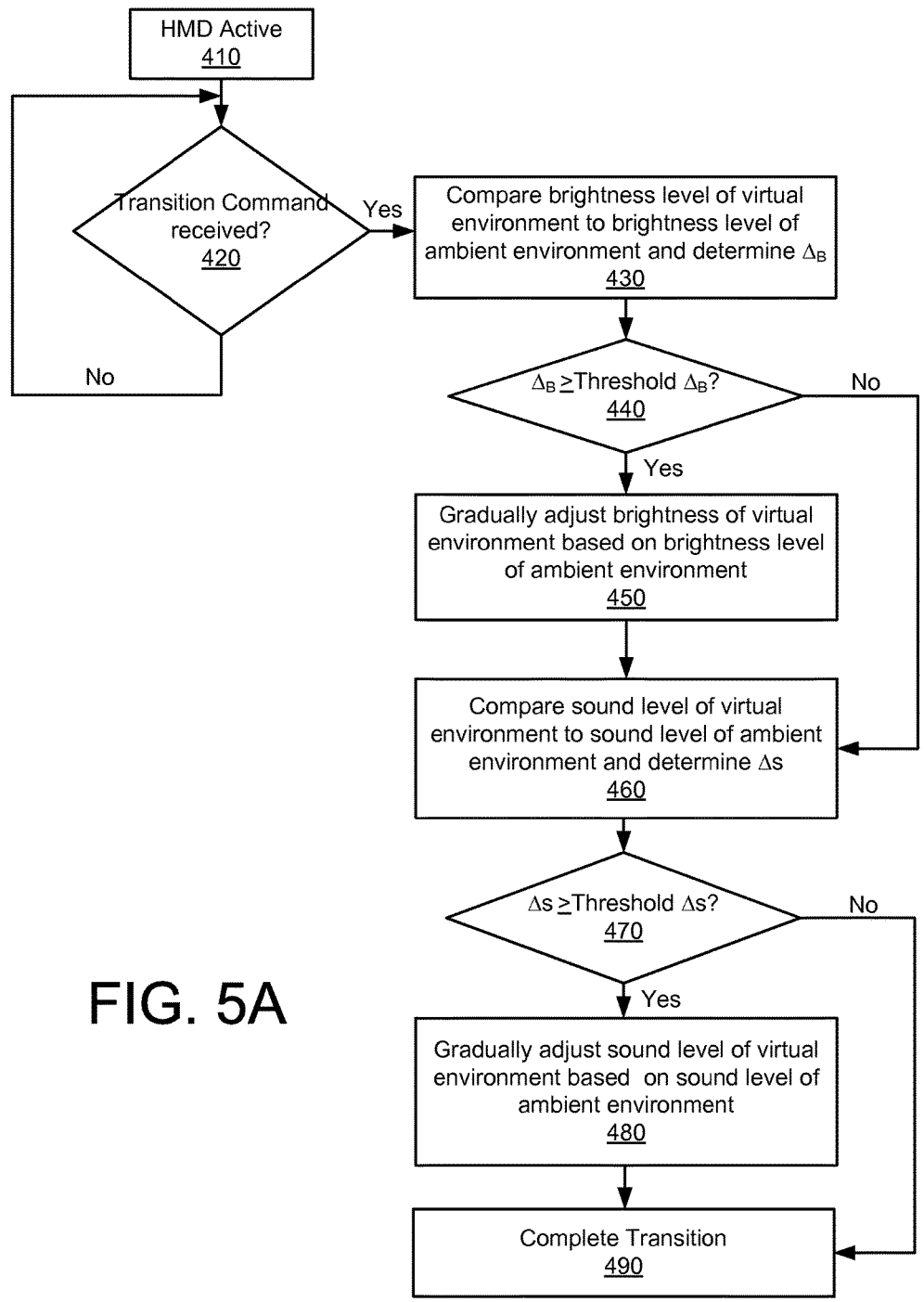
FIGS. 5A and 5B are flowcharts of example methods of automatic environment adaptation when transitioning into and out of an immersive experience, in accordance with an embodiment broadly described herein.
Figure 5B:
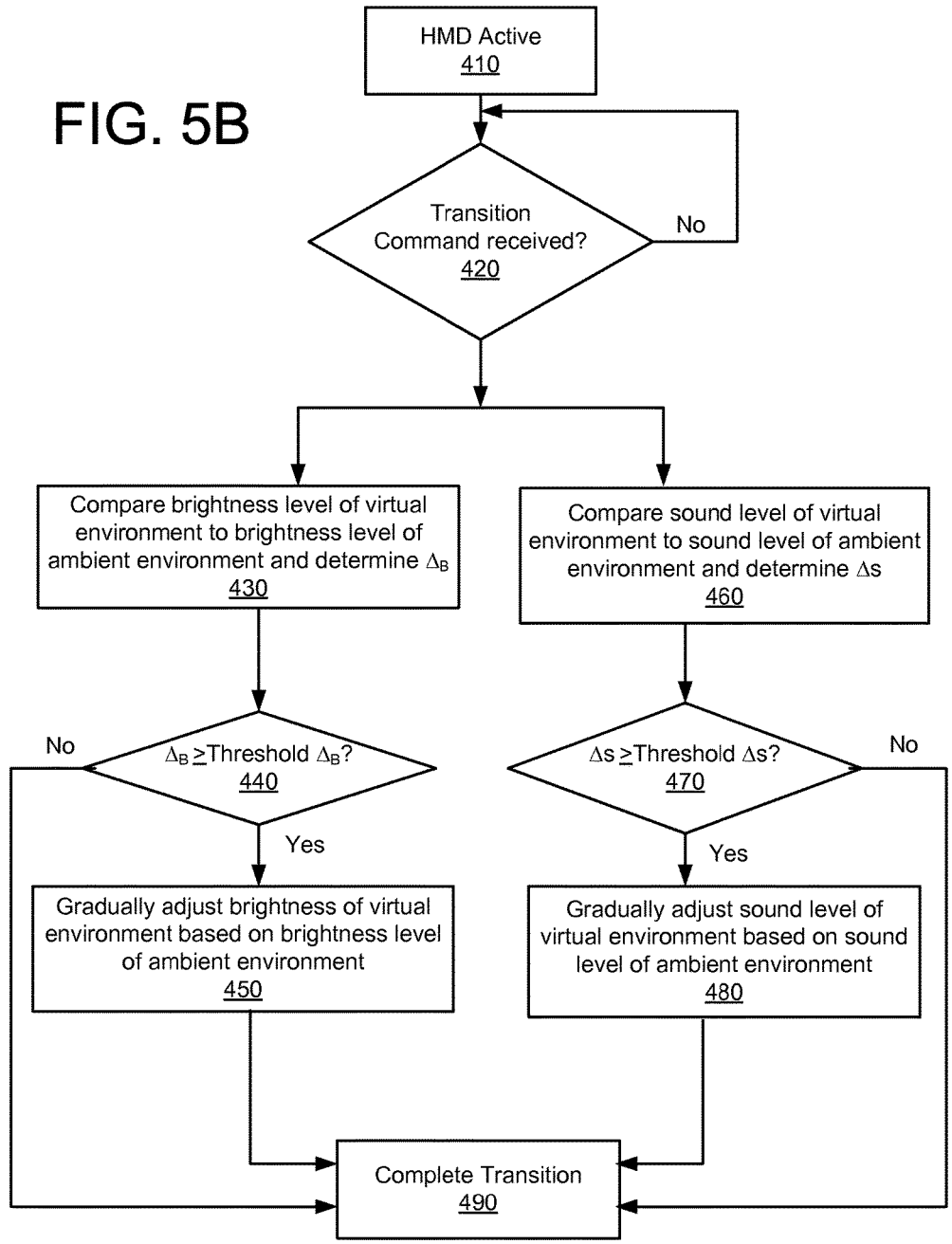

FIGS. 5A and 5B are flowcharts of an example method of adjusting characteristics of a virtual environment based on corresponding characteristics of an ambient environment, in accordance with an embodiment as broadly described herein. As shown in FIG. 5A, if, at block 410, the HMD 100 is active and a transition command is received (e.g., a command to pause/terminate an immersive experience and transition to the ambient environment, or a command to initiate an immersive experience and transition from the ambient environment into the immersive experience) at block 420, at least one of the sensors is activated, such as, for example, the light sensor 162, and, at block 430, the control system 170 compares the brightness level of the virtual environment to the brightness level of the ambient environment as sensed by the light sensor 162. If it is determined at block 440 that the difference between brightness level of the virtual environment and the brightness of the ambient environment exceeds a preset threshold, then the control system 170 gradually adjusts the brightness level of the virtual environment at block 450.

For example, when transitioning from the virtual environment to the ambient environment, the control system 170 gradually adjusts the brightness level of the virtual environment, if the brightness level of the ambient environment is higher (e.g., more than 2 times higher, more than 4 times higher, or other magnitude greater) than the brightness level of the virtual environment, indicating that the room is more brightly lit than the content displayed by the HMD 100, then the control system 170 may increase the brightness level of the virtual environment so that it approaches the brightness of the ambient environment. In some embodiments, the control system 170 may increase the brightness level of the virtual environment linearly over a period of time, or non-linearly over a period of time, or in a step-wise function over a period of time, or other pattern or profile or combination of patterns or profiles in which the brightness level of the virtual environment may be increased to achieve a desired brightness level based on the brightness level of the ambient environment. In some embodiments, the control system 170 may increase the brightness level of the virtual environment so that it is essentially the same as the brightness level of the ambient environment. In some embodiments, the control system 170 may gradually increase the brightness level of the virtual environment so that it is within a preset interval from the brightness level of the ambient environment.

At block 460, at least one of the sensors, such as, for example, the audio sensor 164, which may be, for example, a microphone, is activated, and the control system 170 compares the sound level of the virtual environment to the sound level of the ambient environment. If it is determined at block 470 that the difference between sound level of the virtual environment and the sound level of the ambient environment exceeds a preset threshold, then the control system 170 gradually adjusts the sound level of the virtual environment at block 480.

For example, when transitioning from the virtual environment to the ambient environment, if the noise sound of the ambient environment is lower than the sound level of the virtual environment, indicating that the immersive experience is relatively loud compared to the user's ambient surroundings, then the control system 170 may gradually lower the volume of sound conveyed to the user by the audio output device 130 so that it approaches the detected sound level of the ambient environment. In some embodiments, the control system 170 may gradually decrease the volume associated with the virtual environment so that it is essentially the same as the noise level of the ambient environment. In this example, in some embodiments, the control system may gradually decrease the volume associated with the virtual environment so that it is within a preset interval from the sound level of the ambient environment.

In the example in which the user is transitioning from the virtual environment to the ambient environment, once the brightness level of the virtual environment and the sound level of the virtual environment have been adjusted to a brightness level and a noise level that are within particular thresholds or intervals of the brightness level and the sound level of the ambient environment, the immersive experience may be paused, and the transition may be completed at block 490 by, for example, opening the HMD 100, in response to the command received at block 420. In some embodiments, in which the HMD 100 is capable of operation in the pass through mode as described above, rather than opening the HMD 100 at block 490, the images of the ambient environment captured by the camera 180 may be displayed on the HMD at block 490.

In the example method shown in FIG. 5A, the comparison of brightness levels at block 430 and comparisons of noise levels at block 460 (and subsequent adjustment of the brightness level and/or sound levels of the virtual environment, as appropriate, at blocks 450 and 480, respectively) are shown in series. However, these comparisons may also be conducted in parallel, as shown in FIG. 5B, so that brightness and sound levels are compared substantially concurrently, and brightness and noise sound are adjusted substantially concurrently. This may further facilitate the user's transition/adjustment between the virtual and ambient environments.

FIGS. 3A-3D, 4A-4D and 5A-5B illustrate one example in which the system adapts the virtual environment based on the sensed ambient environment in response to a command to pause/stop and/or open an HMD worn by a user who is actively engaged in an immersive experience. As noted above, the system may, for example, increase or decrease a brightness level of the virtual environment so as to reduce or substantially eliminate a difference between the brightness level of the virtual environment and a brightness level of the ambient environment. Additionally, the system may, for example, increase or decrease a sound level, or volume, of the virtual environment so as to reduce or substantially eliminate a difference between the sound level of the virtual environment and a sound level of the ambient environment. These adjustments in brightness level and/or sound level may facilitate a user's transition or adaptation from the virtual environment into the ambient environment.

In the examples above, a user's transition from the virtual environment to the ambient environment have been presented, simply for ease of discussion. However, in another example implementation, similar approaches may be implemented by the HMD 100 to facilitate the user's transition from the ambient environment into the virtual environment. For example, as the user initiates or returns to an immersive experience, the HMD 100 may gradually adjust a brightness level and/or a sound level of the virtual environment based on a brightness level and/or a sound level of the ambient environment, so that the user is gradually introduced into/back into the virtual environment.

A command to transition from the virtual environment to the ambient environment may be implemented in a variety of different ways. For example, in one embodiment, if a user is wearing the HMD 100 and wishes to transition from an immersive experience generated by the HMD 100 to the ambient environment, the user may actuate the transition control device 176 as described above, by, for example, pushing a button on the HMD 100 to actuate the transition control device 176. Actuation of the transition control device 176 in this manner may initiate the transition process described above in detail and shown in FIGS. 5A and/or 5B.

Figure 6A:
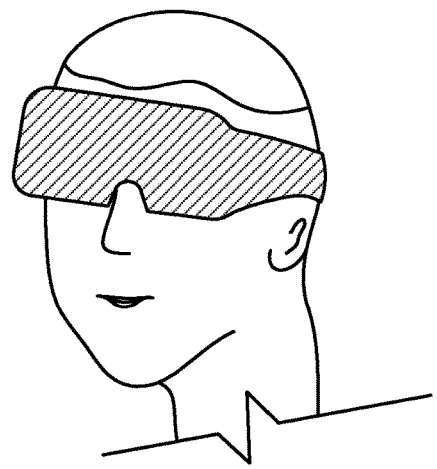
FIGS. 6A-6D illustrate another example implementation of a system for automatically adapting an environment when transitioning into and out of an immersive experience, in accordance with an embodiment broadly described herein.
Figure 6B:
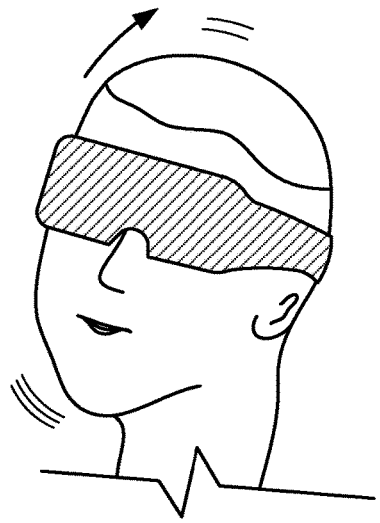
Figure 6C:
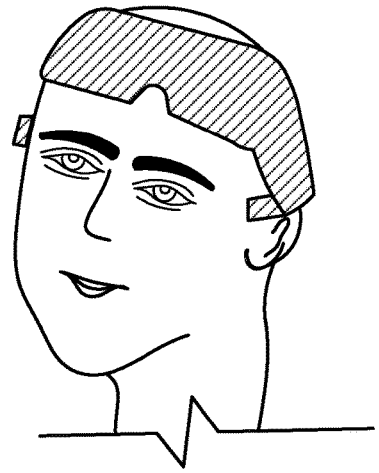
Figure 6D:
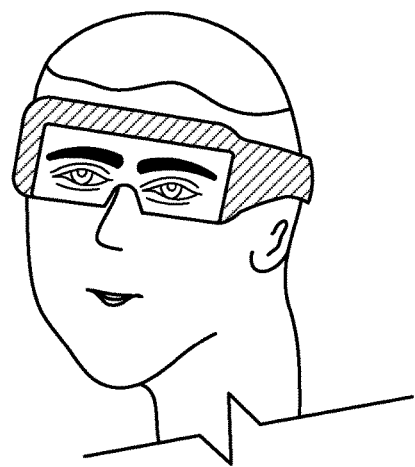

In some embodiments, if the user is wearing the HMD 100, as shown in FIG. 6A, and wishes to transition from the immersive experience generated by the HMD 100 to the ambient environment, the user may actuate the transition control device 176 in a hands free manner, such as, for example, a head movement gesture, such as, for example, a jerking action of the head, as shown in FIG. 6B. The control system 170 may recognize the head movement gesture, or head jerk, as a transition command. Thus, if the user is wearing the HMD 100, with the HMD 100 generating the immersive experience, and the control system 170 detects a head movement gesture, or head jerk, corresponding to a preset transition command, the control system 170, and in particular, the transition control device 176 may initiate the transition process described above and shown in detail in FIGS. 5A and/or 5B. Once the brightness and/or sound levels of the virtual environment have been adjusted based on the brightness and/or sound levels of the ambient environment (as described above) in response to the recognized head movement gesture or head jerk, the transition control device may release the housing portion 110 of the HMD 100 for rotation about the hinges 125 so that the housing portion 110 of the HMD 100 may be moved out of the line of sight of the user, as shown in FIG. 6C. In some embodiments, in response to the recognized head movement gesture or head jerk, the transition control device 176 may control the display 140 to initiate the pass through mode or transparent mode to implement the requested transition, without having to physically move the housing portion 110 of the HMD 100 out of the line of sight of the user, as shown in FIG. 6D.

Similarly, a command to transition from the ambient environment to the virtual environment may be implemented in a variety of different ways. For example, in one embodiment, this transition command may simply involve placing the HMD 100 on the user's head and applying power to the HMD 100. If the user is already wearing the HMD 100 and wishes to transition from the ambient environment to an immersive experience generated by the HMD 100, the user may actuate the transition control device 176 as described above, by, for example, pushing a button on the HMD 100 to actuate the transition control device 176. Actuation of the transition control device 176 in this manner may initiate the transition process described above in detail to gradually adjust brightness and/or sound levels generated by the HMD 100 so that the user is gradually, rather than abruptly, introduced into the virtual environment.

Figure 7A:
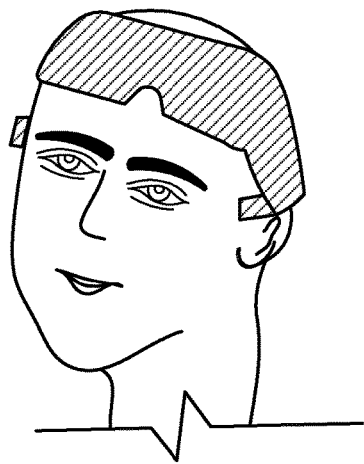
FIGS. 7A-7D illustrate another example implementation of a system for automatically adapting an environment when transitioning into and out of an immersive experience, in accordance with an embodiment broadly described herein.
Figure 7B:
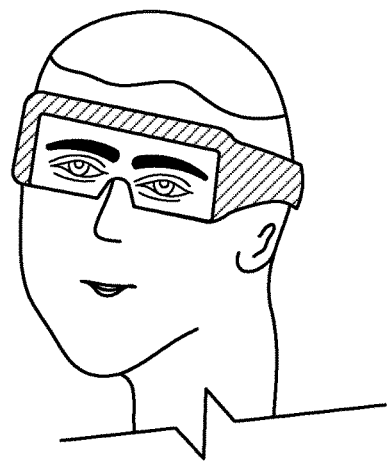
Figure 7C:
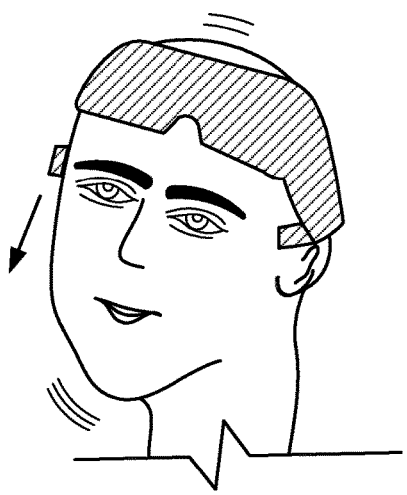
Figure 7D:
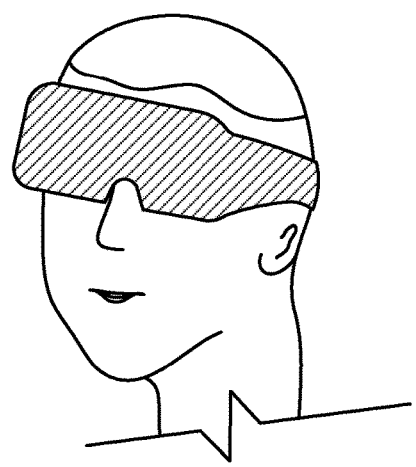

In some embodiments, if the user is in the ambient environment, but is already wearing the HMD 100, as shown in, for example, FIG. 7A or 7B, and wishes to transition from the ambient environment into an immersive experience generated by the HMD 100, the user may actuate the transition control device 176 in a hands free manner, such as, for example, a head movement gesture, such as, for example, a jerking action of the head, as shown in FIG. 7C. The control system 170 may recognize the head movement gesture, or head jerk, as a transition command. Thus, if the user is wearing the HMD 100 in the ambient environment as shown in FIG. 7A or 7B, and the control system 170 detects a head movement gesture, or head jerk, corresponding to a preset transition command, the control system 170, and in particular, the transition control device 176 may initiate the transition process, and the transition control device may either release the housing portion 110 of the HMD 100 for rotation about the hinges 125 so that the housing portion 110 of the HMD 100 may be moved from the position shown in FIG. 7A to the position shown in FIG. 7D, or from the pass through or transparent mode shown in FIG. 7B to the active mode shown in FIG. 7D.

In some embodiments, the transition command may be received in the form of a voice command. This voice command may be received by, for example, the microphone described above and recognized by the control system 170 as a preset transition command.

In some embodiments, the transition command may be received in the form of a hand and/or arm gesture captured within the field of view of the camera 180. The captured hand and/or arm gesture may be transmitted to the control system 170 and recognized by the control system as a preset transition command.

In some embodiments, the transition command may be received by the HMD 100 when a sensor included on the HMD 100, such as, for example a proximity sensor, a contact sensor, a light sensor or other such sensor, detects that user has fitted the HMD 100 on the head of the user, or has removed the HMD 100 from the head of the user. A signal from this sensor may be transmitted to the control system 170 to indicate to the control system 170 that the HMD 100 is now being worn and initiate a transition from the ambient environment to the virtual environment.

When involved in an immersive experience generated by the HMD 100, a user may become so involved in the immersive experience that detection of happenings in the ambient environment of which the user should be aware, or would like to be aware, may be difficult. While engaged in the immersive experience, the user may wish to be alerted to certain occurrences or circumstances in the ambient environment, such as, for example, other people and/or pets entering and/or exiting the room, another person in the room requiring their attention, a visitor at the door/requesting entry/access, a phone call or text message, announcements, and other such occurrences or circumstances, not to mention safety alerts such as, for example, smoke alarms, unauthorized entry and the like. In some embodiments, these types of alerts may automatically trigger a transition out of the VR immersive experience, automatically issuing a transition command to the HMD 100. In some embodiments, these alerts may provide an indication to the user the user that causes the user to issue a manual transition command (i.e., pushing of the transition button and the like) to the HMD 100.

In some embodiments, the HMD 100 may include various sensors capable of detecting and tracking movement of other people and/or pets in the room, gestures made by other people in the room, a prolonged stare, or eye gaze directed at the user from another person in the room.

For example, in some embodiments, the HMD 100 may include the camera 180 described above. The camera 180 may be capable of capturing images of another person(s) or pet(s) entering and/or exiting the room. The controller 170 may recognize the image(s) captured by the camera 180 as another person(s) or pet(s) entering and/or exiting the room, and may generate an indicator alerting the user accordingly based on the activity that has been recognized by the controller 170. This indicator may allow the user to take appropriate action based on the detected activity.

In some embodiments, the camera 180 may detect a prolonged eye gaze, or stare, directed at the user by another person in the room within the range of the camera 180, and recognize this prolonged stare as a gesture intended to capture the attention of the user.

In some embodiments, the camera 180 may detect a particular gesture, such as, for example, a hand or arm gesture, directed at the user by another person in the room. This hand or arm gesture may be, for example, a hand or arm wave directed at the user and/or sustained for a predetermined period of time, which may be captured by the camera 180 and recognized by the controller 170 as a gesture intended to capture the attention of the user.

In some embodiments, the camera 180 may detect a specific and/or sudden movement of another person in the room, such as, for example, another person running deliberately toward the user, which may be captured by the camera 180 and recognized by the controller 170 as a movement intended to capture the attention of the user.

In some embodiments, the indicator may be, for example, a visual indicator displayed on the display 140 of the HMD 100. In some embodiments, the visual indicator may include, for example, a message in the form of text characters and/or icons displayed on the display 140. In some embodiments, the visual indicator may be a change in color displayed on the display 140.

In some embodiments, the indicator may include, for example, a pass through video feed generated by the camera 180 as described in more detail above. This type of pass through video feed of the ambient environment may temporarily replace the video image component of the immersive experience as described above, or may be superimposed on, as a ghost image, on the currently displayed image component of the immersive experience. In some embodiments, in the case of a transparent display as described above, the indicator may be a pause in the display of the image component of the immersive experience on the display 140, allowing the ambient environment to be visible through the transparent display.

In some embodiments, the indicator may be an audible indicator, such as, for example, an audible alarm or message either superimposed on a current audio stream output by the audio output device 130, or an interruption in the current audio output stream output by the audio output device 130, or an interruption followed by an audible alarm signal or audible message.

In some embodiments, the HMD 100 may include the audio sensor 164 as described above, capable of detecting sound levels and/or audio inputs in the ambient environment, and may include the camera 180 which may also include a microphone capable of detecting audio signals in the ambient environment. The audio sensor 164 and/or the microphone of the camera 180 may detect certain audio signals which the controller 170 may recognize as occurrences for which an alert may be generated.

For example, in some embodiments, the audio sensor 164 and/or the microphone of the camera 180 may detect sounds which the controller 170 may recognize as corresponding to, for example, a doorbell or a knock at the door, a ringtone associated with a text message and/or voice call, a preset phrase (such as, for example, the user's name, a call to attention such as "attention" or "excuse me" and the like), an alarm (such a, for example, a smoke/fire alarm, a tone), an announcement (such as, for example, an announcement conveyed over a public address system), and the like. In response to the detected/recognized sound, the controller 170 may control the HMD 100 to generate an indicator alerting the user accordingly based on the sound that has been recognized by the controller 170. As noted above, the indicator may be, for example, a visual indicator or an audio indicator. The visual indicator may be displayed on the display 140, or through the display 140, as described above. The audio indicator may be conveyed to the user through the audio output device 130 of the HMD 100 either superimposed on, or after interruption of, the current audio output stream output by the audio output device 130. The audible indicator may be, for example, a tone or other audible alert providing an indication of the detected audio signal, and/or may be a pass through of the detected audio signal through the audio output device 130 and/or audible by the user once the audio stream associated with the immersive environment has been interrupted.

In some embodiments, the HMD 100, for example, a communication module of the controller 170, may be configured to communicate with various external systems. For example, in some embodiments, the HMD 100 may be configured to communicate with various environmental monitoring systems such as, for example, an HVAC control system (such as a thermostat), an access control system (such as an alarm system installed to monitor and control access to a given space and issue alarms in response to unauthorized access), a safety control system (such as a smoke/heat/carbon monoxide detection system, either alone or combined with a sprinkler system), and other such systems. In some embodiments, the environmental monitoring system may detect an event and generate a notification of the detected event to the HMD 100.

For example, in the case of an access control system, the system may detect entry and/or exit of a person(s) and provide notification of the detected entry and/or exit. Upon receiving the notification from the access control system, the HMD 100 may generate the audio and/or visual indicator as described above.

In some embodiments, the access control system may include an imaging system (such as, for example, a dropcam) which may be configured to individually identify a particular person/people entering and/or exiting. For example, in some embodiments, the access control system may include an imaging system configured to perform facial recognition. In this case, the notification transmitted from the access control system to the HMD 100 may include identification information, in addition to the notification of entry and/or exit.

In the case of an HVAC control system, in some embodiments, the HVAC system, or thermostat, may include sensors, for example, infrared sensors capable of detecting infrared (IR) thermal signatures to determine, for example, a number of people in a room and a distribution of those people in the room to set target room temperature(s) and control and update the supply of heating/air conditioning based on this determination.

In some embodiments, this IR thermal detection capability may also be used to monitor entry and/or exit of people and/or pets. Upon detection of entry of a new person or pet, and/or detection of exit of a person and or pet based on changes in the IR thermal signatures detected by the HVAC control system, the system may generate a corresponding notification to the HMD 100. Upon receiving the notification from the HVAC control system, the HMD 100 may generate the audio and/or visual indicator as described above. When combined with an imaging system (such as, for example, a drop cam) as described above, the notification transmitted from the HVAC control system to the HMD 100 may include identification information, in addition to the notification of entry and/or exit.

In the case of a safety control system, upon detection of an unsafe level of smoke and/or heat and/or carbon monoxide, in addition to the alarm typically generated by the system, the system may also provide notification of the alarm to the user through the HMD 100. Upon receiving the notification from the safety control system, the HMD 100 may generate the audio and/or visual indicator as described above.

In some embodiments, the HMD 100 may be configured to receive user inputs to establish user preferences related to these types of notifications while engaged in an immersive VR experience. For example, in some embodiments, the HMD 100 may be capable of receiving an input indicating a user's desired level of interruption. For example, a first threshold for interruption may be set when the user is in a dedicated game environment, and a second threshold for interruption may be set when the user is in a more public environment, such as, for example, on public transportation, in a dining establishment, or other more public venue. The second threshold may, for example, allow for a larger sample of events to trigger interruption of the user in the immersive environment, and/or may cause some of all trigger events to more quickly interrupt the user in the immersive environment.

In some embodiments, the HMD 100 may be capable of receiving various other user inputs and preferences. For example, in some embodiments, the HMD 100 may be capable of receiving a listing, or recording, of key words and/or phrases which may trigger an interruption in some or all environments. Such words and/or phrases may include, for example, a user's name, and other such personalized words and/or phrases. In some embodiments, these personalized words and/or phrases may be in addition to other, more general words and/or phrases which may be preset in the HMD 100 to trigger interruption, such as, for example, "excuse me" and other such general words and/or phrases.

In some embodiments, the HMD 100 may include different operating modes allowing for varying degrees of interruption, varying levels of tolerance for events for triggering interruption, different modes of notification and the like, so that use of the HMD 100 may be further tailored for a particular environment. For example, in some embodiments, operating modes of the HMD 100 may include a do not disturb mode, in which the user is not interrupted while engaged in the VR immersive experience.

In some embodiments, operating modes of the HMD 100 may include, for example, a public transportation mode having a relatively low threshold for allowing interruption (i.e., a relatively small amount of external stimulus required to generate interruption) due to the public nature of the environment and relatively high need for awareness of the external environment.

In some embodiments, operating modes of the HMD 100 may include a flight mode, or airplane mode, in which in-flight announcements, and other communication from flight crew and passengers may automatically interrupt the VR immersive experience. Numerous other operating modes, based on, for example, environments frequented by the user, may also be included in the HMD 100.

In some embodiments, the HMD 100 may be configured such that some announcements, such as, for example, public safety announcements, always interrupt the VR immersive experience, regardless of the selected mode of operation of the HMD 100. In some embodiments, these types of announcements may be preceded by a tone that is, for example, preset in the HMD 100 and recognized by the HMD 100 as preceding a safety announcement.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of operating an audio visual device configured to generate a virtual environment, the method comprising:
   receiving a command, of a plurality of transition commands, to transition between the virtual environment generated by the audio visual device and an ambient environment, the plurality of transition commands including a first command to transition from the virtual environment to the ambient environment and a second command to transition from the ambient environment to the virtual environment; and
   transitioning between the virtual environment and the ambient environment in response to the received command, including:
      sensing, by a sensing device of the audio visual device, a brightness level of the ambient environment and a sound level of the ambient environment;
      comparing the sensed brightness level of the ambient environment to a brightness level of the virtual environment;
      calculating a difference between the ambient brightness level and the virtual brightness level;
      comparing the sensed sound level of the ambient environment to a sound level of the virtual environment;
      in response to the first command,
         incrementally adjusting the virtual brightness level until a difference between the sensed ambient brightness level and the virtual brightness level is less than or equal to a preset brightness difference threshold;
         incrementally adjusting the virtual sound level until a difference between the sensed ambient sound level and the virtual sound level is less than or equal to a preset sound difference threshold; and
         transitioning from the virtual environment to the ambient environment; and
      in response to the second command,
         incrementally adjusting the virtual brightness level until the difference between the ambient brightness level and the virtual brightness level is less than or equal to the preset brightness difference threshold;
         incrementally adjusting the virtual sound level until the difference between the ambient sound level and the virtual sound level is less than or equal to the preset sound difference threshold; and
         transitioning from the ambient environment to the virtual environment.

2. The method of claim 1, wherein transitioning between the virtual environment and the ambient environment comprises transitioning between the virtual environment and the ambient environment when the difference between the ambient brightness level and the virtual brightness level is less than or equal to the preset brightness difference threshold and the difference between the ambient sound level and the virtual sound level is less than or equal to the preset sound difference threshold.

3. The method of claim 1, wherein incrementally adjusting the virtual brightness level comprises incrementally adjusting the virtual brightness level toward the ambient brightness level until the difference between the ambient brightness level and the virtual brightness level is less than or equal to the preset brightness difference threshold.

4. The method of claim 3, wherein incrementally adjusting the virtual sound level comprises incrementally adjusting the virtual sound level toward the ambient sound level until the difference between the ambient sound level and the virtual sound level is less than or equal to the preset sound difference threshold.

5. The method of claim 1, wherein incrementally adjusting the virtual brightness level comprises incrementally adjusting the virtual brightness level from an initial brightness level corresponding to the ambient brightness level to a final brightness level corresponding to the virtual environment.

6. The method of claim 5, wherein incrementally adjusting the virtual sound level comprises incrementally adjusting the virtual sound level from an initial sound level corresponding to the ambient sound level to a final sound level corresponding to the virtual environment.

7. The method of claim 1, wherein receiving the command to transition between the virtual environment and the ambient environment includes receiving the first command, comprising:
   detecting an event in the ambient environment;
   determining that the detected event is one of a plurality of predetermined events related to interruption of the virtual environment;
   generating an indicator of the detected event and transmitting the indicator via the audio visual device; and
   requesting an interruption in the virtual environment generated by the audio visual device in response to the indicator.

8. The method of claim 7, wherein
   detecting the event in the ambient environment includes detecting at least one of a visual event captured by a camera of the audio visual device or an audio event captured by a microphone of the audio visual device, and wherein
   generating the indicator of the detected event and transmitting the indicator via the audio visual device includes at least one of generating a visual indicator and displaying the visual indicator on a display of the audio visual device, or generating an audible indicator and outputting the audio indicator via an audio output device of the audio visual device.

9. The method of claim 8, wherein detecting at least one of the visual event captured by a camera of the audio visual device or the audio event captured by a microphone of the audio visual device includes detecting at least one of a predetermined image in a field of view of the camera or a predetermined audio output signal in a range of the microphone.

10. The method of claim 9, wherein
  detecting the predetermined image in a field of view of the camera includes detecting at least one of a gesture, a movement, or a sustained gaze in a predetermined direction, and determining that the detected predetermined image corresponds to an event for which an interruption in the virtual environment is requested, and wherein
  detecting the predetermined audio output signal in a range of the microphone includes detecting at least one of a voice input, an alarm tone, or a predetermined temporal sequence of tones, and determining that the detected predetermined audio output signal corresponds to an event for which an interruption in the virtual environment is requested.

11. The method of claim 8, wherein
  generating the visual indicator includes at least one of displaying characters on the display of the audio visual device indicating detection of the event in the ambient environment, changing a color displayed on the audio visual device indicating detection of the event in the ambient environment, or displaying an image on the display of the audio visual device corresponding to the event detected in the ambient environment, and wherein
  generating the audible indicator includes at least one of outputting an audible tone through an audio output device of the audio visual device indicating detection of the event in the ambient environment, or outputting an audio feed of the detected event through the audio output device of the audio visual device.

12. The method of claim 7, wherein detecting the event in the ambient environment includes:
  receiving a signal from an external device, the signal including data indicating detection of at least one of a predetermined visual event or a predetermined audio event;
  determining that the detected event corresponds to the at least one of the predetermined visual event or the predetermined audio event for which interruption of the virtual environment is requested; and
  at least one of generating a visual indicator corresponding to the detected event and displaying the visual indicator on the display of the audio visual device, or generating an audible indicator corresponding to the detected event and outputting the audio indicator via the audio output device of the audio visual device.

13. The method of claim 1, wherein receiving the command to transition between the virtual environment generated by the audio visual device and the ambient environment includes:
  determining that the received transition command is the first transition command based on a detected physical movement of the audio visual device in a first direction, and determining that the received transition command is the second transition command based on a detected physical movement of the audio visual device in a second direction;
  in response to the first transition command, automatically moving an optical component of the head mounted audio visual device out of a line of sight of a user; and
  in response to the second transition command, automatically moving the optical component of the head mounted audio visual device into the line of sight of the user.

14. The method of claim 13, further comprising sensing the physical movement of the audio visual device in the first direction including sensing a head jerking motion of the head mounted audio visual device in an upward direction, and sensing the physical movement of the audio visual device in the second direction including sensing a head jerking motion of the head mounted audio visual device in a downward direction.

15. An audio visual device configured to generate a virtual environment, comprising:
  a frame;
  a housing coupled to the frame;
  an optical system and a display system received in the housing;
  an audio output device operably coupled to the display system;
  a sensing device located and configured to sense an ambient brightness level and an ambient sound level; and
  a control system including a processor operably coupled to the optical system, the display system, the audio output device and the sensing device, the control system including a transition module configured to:
    receive an external command to transition between the virtual environment and the ambient environment, the received external command being one of a plurality of external commands, the plurality of external commands including a first command to transition from the virtual environment to the ambient environment and a second command to transition from the ambient environment; and
    in response to the received external command, transition between the virtual environment and the ambient environment, including:
      in response to the first command, adjust a brightness level of the virtual environment based on the sensed ambient brightness level, and adjust a sound level of the virtual environment based on the sensed ambient sound level while transitioning from the virtual environment to the ambient environment; and
      in response to the second command, adjust the brightness level of the virtual environment to within a predetermined interval of the ambient brightness level, and adjust the sound level of the virtual environment to within a predetermined interval of the ambient sound level, based on the sensed ambient brightness level and the sensed ambient sound level, while transitioning from the ambient environment to the virtual environment.

16. The device of claim 15, wherein the control system is configured to:
  determine that the received external command is the first command to transition from the virtual environment to the ambient environment based on a detected physical movement of the audio visual device in a first direction;
  determine that the received external command is the second command to transition from the ambient environment to the virtual environment based on a detected physical movement of the audio visual device in a second direction;
  in response to the first command, control the transition module to automatically move an optical component of the head mounted audio visual device out of a line of sight of a user; and
  in response to the second command, control the transition module to automatically move the optical component of the head mounted audio visual device into the line of sight of the user.

17. The method of claim 16, wherein the control system is configured to:
- determine that the received external command is the first command in response to a detected head jerking motion of the head mounted audio visual device in an upward direction; and
- determine that the received external command is the second command in response to a detected head jerking motion of the head mounted audio visual device in a downward direction.

* * * * *